United States Patent
Linster et al.

(10) Patent No.: US 9,327,218 B2
(45) Date of Patent: May 3, 2016

(54) BERNOULLI FILTER

(75) Inventors: Wolfgang Linster, Bremen (DE);
Michael Maier, Bassum-Hallstedt (DE)

(73) Assignee: Georg Schunemann GmbH, Bremen (DE)

( * ) Notice: Subject to any disclaimer, the term of this patent is extended or adjusted under 35 U.S.C. 154(b) by 873 days.

(21) Appl. No.: 13/440,550

(22) Filed: Apr. 5, 2012

(65) Prior Publication Data
US 2012/0255915 A1    Oct. 11, 2012

(30) Foreign Application Priority Data

Apr. 7, 2011    (DE) .......................... 10 2011 007 003

(51) Int. Cl.
| | | |
|---|---|---|
| *B01D 29/66* | (2006.01) | |
| *B01D 35/12* | (2006.01) | |
| *B01D 29/52* | (2006.01) | |
| *B01D 29/64* | (2006.01) | |

(52) U.S. Cl.
CPC ............ *B01D 29/52* (2013.01); *B01D 29/6423* (2013.01); *B01D 29/6484* (2013.01); *B01D 29/665* (2013.01); *B01D 29/668* (2013.01); *B01D 35/12* (2013.01); *B01D 2201/44* (2013.01)

(58) Field of Classification Search
None
See application file for complete search history.

(56) References Cited

U.S. PATENT DOCUMENTS

| | | | | |
|---|---|---|---|---|
| 1,130,725 | A * | 3/1915 | Getts ..................... | B01D 33/067 210/413 |
| 1,199,350 | A * | 9/1916 | Collin .................... | B01D 29/05 137/244 |
| 1,428,270 | A * | 9/1922 | Braun .................... | B01D 35/12 210/341 |
| 1,906,391 | A * | 5/1933 | McKinley .............. | B01D 29/15 210/411 |
| 1,987,142 | A * | 1/1935 | Clements, Jr. ......... | B01D 29/03 210/136 |

(Continued)

FOREIGN PATENT DOCUMENTS

| | | |
|---|---|---|
| DE | 202005019664 U1 | 2/2007 |
| DE | 102005055555 A1 | 5/2007 |

(Continued)

OTHER PUBLICATIONS

Korean Intellectual Property Office, Office Action received in Patent Application No. 10-2012-0036247 dated Mar. 13, 2015.

*Primary Examiner* — Robert James Popovics
(74) *Attorney, Agent, or Firm* — Wood, Herron & Evans, LLP

(57) ABSTRACT

A filter apparatus and method for filtering a liquid. The filter apparatus comprises a housing that has at least one inlet for admission of the liquid to be filtered and at least one outlet for discharge of the filtered liquid. The apparatus further comprises at least two substantially cylindrical filter elements that can be fitted into the housing and which have a plurality of openings through which the liquid can flow to filter particles out of the liquid, and at least one filter cleaning element that can be introduced into a respective filter element in a region of an inner surface of the filter element to increase a flow speed of the liquid to be filtered so that substances in the filter element are flushed away. The filter elements are further connected in a parallel arrangement in the filter apparatus.

13 Claims, 8 Drawing Sheets

(56) References Cited

U.S. PATENT DOCUMENTS

| | | | | |
|---|---|---|---|---|
| 1,994,656 A * | 3/1935 | Liddell | B01D 29/15 | 210/412 |
| 2,047,793 A * | 7/1936 | McKinley | B01D 27/00 | 210/133 |
| 2,173,060 A * | 9/1939 | Andrews | B01D 29/117 | 210/333.1 |
| 2,338,417 A * | 1/1944 | Forrest | B01D 29/0036 | 210/412 |
| 2,338,418 A * | 1/1944 | Forrest | B01D 29/15 | 210/412 |
| 2,338,419 A * | 1/1944 | Forrest | B01D 29/15 | 210/412 |
| 2,359,938 A * | 10/1944 | Quiroz | B01D 35/12 | 210/333.1 |
| 2,429,417 A * | 10/1947 | Magill | B01D 29/48 | 210/333.1 |
| 2,441,526 A * | 5/1948 | Zollinger | B01D 29/0036 | 210/108 |
| 2,505,375 A * | 4/1950 | Wohlfarth | B01D 35/12 | 137/545 |
| 2,525,000 A * | 10/1950 | Goodman | B01D 29/0036 | 165/119 |
| 2,540,300 A * | 2/1951 | Smith | B01D 35/12 | 210/333.1 |
| 2,606,663 A * | 8/1952 | Blackman | B01D 29/356 | 210/303 |
| 2,645,173 A * | 7/1953 | McWatters | A47J 31/20 | 99/283 |
| 2,670,081 A * | 2/1954 | Quinn | B01D 35/26 | 210/266 |
| 3,278,031 A * | 10/1966 | Rosaen | B01D 24/04 | 210/106 |
| 3,365,065 A * | 1/1968 | Varjabedian | B01D 29/114 | 210/332 |
| 3,392,835 A * | 7/1968 | Asper | B01D 29/114 | 210/138 |
| 3,394,735 A * | 7/1968 | Wurster | B01D 35/12 | 137/625.32 |
| 3,623,607 A * | 11/1971 | Loos | B01D 29/114 | 210/106 |
| 3,850,802 A | 11/1974 | Berger | | |
| 3,994,810 A * | 11/1976 | Schaeffer | B01D 29/232 | 210/103 |
| 4,019,984 A * | 4/1977 | Mohn | B01D 29/35 | 100/116 |
| 4,081,171 A * | 3/1978 | Morgan | B01D 35/04 | 137/549 |
| 4,295,963 A * | 10/1981 | Drori | B01D 29/15 | 210/108 |
| 4,360,037 A * | 11/1982 | Kendall | B01D 25/38 | 137/242 |
| 4,552,655 A * | 11/1985 | Granot | B01D 29/114 | 210/108 |
| 4,632,757 A * | 12/1986 | Rosenberg | B01D 29/114 | 210/411 |
| 4,740,301 A * | 4/1988 | Lopez | B01D 61/08 | 210/321.87 |
| 4,859,335 A * | 8/1989 | Whyte | B01D 29/114 | 210/333.1 |
| 4,906,357 A | 3/1990 | Drori | | |
| 5,106,500 A * | 4/1992 | Hembree | B01D 29/117 | 210/266 |
| 5,164,079 A * | 11/1992 | Klein | B01D 29/117 | 210/186 |
| 5,198,111 A * | 3/1993 | Davis | B01D 29/118 | 209/273 |
| 5,364,539 A * | 11/1994 | Castagno | B01D 29/05 | 100/116 |
| 5,527,462 A * | 6/1996 | Davis | B01D 29/25 | 209/273 |
| 5,733,464 A * | 3/1998 | Bunch | B01D 29/15 | 119/215 |
| 5,804,072 A * | 9/1998 | Yang | B01D 29/117 | 210/106 |
| 5,882,528 A * | 3/1999 | Davidson | B01D 29/21 | 210/167.13 |
| 6,402,948 B1 * | 6/2002 | Pakki | B01D 17/0214 | 210/222 |
| 6,443,312 B1 * | 9/2002 | Racine | B01D 29/118 | 210/106 |
| 7,691,274 B2 * | 4/2010 | Wnuk | B01D 29/52 | 210/136 |
| 8,524,075 B1 * | 9/2013 | Quintel | B01D 29/232 | 210/108 |
| 8,828,223 B2 * | 9/2014 | Savage | A47J 37/1223 | 210/106 |
| 2012/0255915 A1 * | 10/2012 | Linster | B01D 29/52 | 210/767 |
| 2014/0034568 A1 * | 2/2014 | Kawano | B01D 29/86 | 210/407 |
| 2014/0284257 A1 * | 9/2014 | Park | B01D 29/23 | 210/105 |

FOREIGN PATENT DOCUMENTS

| | | |
|---|---|---|
| DE | 102006039508 A1 | 3/2008 |
| DE | 102009012444 A1 | 9/2010 |
| KR | 100768080 B1 | 10/2007 |
| SE | 9000803 B | 3/1991 |

* cited by examiner

BERNOULLI FILTER

TECHNICAL FIELD

The invention concerns a filter apparatus for filtering liquids and a method of filtering liquids.

BACKGROUND

Filter apparatuses of the kind set forth in the opening part of this specification are known, for example, from DE 10 2005 055 555 or SE 464 062. Such a filter apparatus generally has a housing having an inlet and an outlet, and a filter element in the housing. In that case, the filter element is generally substantially cylindrical. In addition, such filter apparatuses of the general kind set forth above have a filter cleaning element which can be introduced into the cylindrical filter element along the central axis thereof. That axial introduction of the filter cleaning element causes an increase in a flow speed in a region of an inner surface of the filter element by virtue of a reduction in cross-section, whereby substances adhering in the filter element are flushed away. Cleaning of such a filter element is therefore generally effected without contact by an increase in flow speed. Therefore, such filter apparatuses are also referred to as Bernoulli filters.

Such filter apparatuses or Bernoulli filters are used in a large number of industrial applications, for example in the petrochemical or pharmaceutical industry, in the energy economy, and also on ships.

Although contact-less self-cleaning of such filter apparatuses of the general kind set forth above represents a major advantage in the use of such filters, the structural size of such filter apparatuses is a particular disadvantage. In particular, the structural size is dependent on the size of the volume flow of liquid to be filtered, so that the throughput of liquid to be filtered is limited by virtue of structural size restrictions. A further disadvantage lies in the manner of cleaning the filter apparatus. During cleaning by means of the introduction of the filter cleaning element, the filter apparatus has to be operated with an increased pump output.

SUMMARY

An object of the present invention is to provide a filter apparatus and a method of filtering liquids, which are improved at least in respect to one of the above-mentioned problems. In particular, an object of the present invention is to provide a filter apparatus and a method which has a reduced structural size, which permits a more compact structure for a filter apparatus, can filter an increased volume flow of liquid to be filtered, and/or in which the availability of a filter apparatus is increased.

This object is attained by a filter apparatus of the kind set forth in the opening part of this specification comprising a housing which has at least one inlet for admission of the liquid to be filtered, and at least one outlet for discharge of the liquid to be filtered. The filter apparatus also includes at least two substantially cylindrical filter elements which can be fitted into the housing and which have a plurality of openings through which the liquid can flow so that particles are filtered out of the liquid, and at least one filter cleaning element. The filter elements are connected in a parallel arrangement in the filter apparatus, and the at least one filter cleaning element can be introduced into a filter element to increase a flow speed of the liquid to be filtered in a region of an inner surface of the filter element, so that substances in or adhering to the filter element are flushed away. Such filter apparatuses can also be referred to as multi-Bernoulli filters.

By at least two filter elements being connected in a parallel relationship in the housing, the structural size of the filter apparatus is substantially reduced according to the invention, and the structure is more compact. The volume flow of liquid to be filtered that can be passed through a filter apparatus is substantially dependent on an operative surface of a filter element. By a plurality of, e.g., at least two, filter elements being arranged in a housing, the volume flow which can be passed through is increased without substantially increasing the structural size of the filter apparatus. In addition, the operational readiness of an apparatus according to the invention is substantially enhanced, as it is possible for the two or more filter elements to be cleaned in succession or independently of each other. That is, in each case at least one filter element can be used for filtering. In that way, the operation of a filter apparatus according to the invention is not interrupted, but only the volume flow of the filtered liquid is briefly reduced, or the pump delivery is briefly slightly increased. In addition, a back-flushing volume flow used for cleaning a filter element is substantially reduced, which is possible because the filter elements are connected in a parallel arrangement. That means that the filter elements are connected in a parallel arrangement in relation to the liquid flow flowing through the filter apparatus. For example, the liquid flow enters the filter apparatus through the inlet. A first part of the liquid flow then flows through a first filter element, and a second part of the liquid flow flows at the same time through a second filter element. The two filtered partial flows of the liquid flow are then combined and flow jointly out of the outlet of the filter apparatus. If the filter apparatus has more than two filter elements, for example three, four, five and so forth, all filter elements are connected in parallel. The housing has at least one inlet. Preferably, the housing has as many inlets as filter elements. It is then preferable for an inlet to be associated with each filter element or vice-versa. In that way, parallel connection of the filter elements is particularly simple. Alternatively, the filter apparatus may have one or more inlets, in which case two or more filter elements are associated with a respective inlet. The filter elements are of a substantially cylindrical configuration, and are therefore preferably cylindrical. The expression substantially cylindrical filter elements also embraces square, rectangular, polygonal, oval and so forth shaped filter elements.

In a first preferred embodiment, the housing is substantially cylindrical and the filter elements are so arranged in the housing that the central axes of the housing and the filter elements are substantially parallel to each other, and the sum of the operative surfaces of the filter elements that can have liquid flowing therethrough is greater than the radially inner surface of the housing. The operative surfaces of the filter element are the surfaces of the filter element that perform the filter function, i.e., the surfaces which have a plurality of openings. If the filter elements are, for example, completely hollow-cylindrical, the operative surface of such a filter element is the peripheral surface of the cylinder. By the sum of the operative surfaces (i.e., surface areas) of the filter elements being greater than the radial inner surface of the housing, the structural size of the filter apparatus is substantially reduced. In particular, the parallel arrangement of the central axes of the housing and of the filter elements makes it possible to achieve a compact structure for the filter apparatus.

In a further preferred configuration of the invention, the liquid to be filtered flows substantially radially from the inside outwardly through the filter element, and in each case an inlet of a filter element is arranged at an axial end of the filter element. Accordingly, the cylindrical peripheral surface of the cylindrical filter element forms the operative surface of the filter element. The inlet is then axially arranged in such a way that the liquid to be filtered first flows substantially axially into the interior of the filter element. Then, the liquid to be filtered flows through the operative surface in the radial direction outwardly out of the filter element, and is thereby filtered. The filtered liquid passes into an intermediate space between housing and filter elements and flows out of that intermediate space through the outlet in the housing. That provides a positive influence on the compact structure of the filter apparatus so that the structural size is further reduced. In that arrangement, the outlet can be arranged axially, radially, or inclinedly with respect to the housing and/or the filter elements.

In a further embodiment, the inlets of the filter elements are connected to an inlet distributor adapted to distribute an inlet flow of the liquid to be filtered substantially uniformly to the inlets of the filter elements. Such an inlet distributor can be formed, for example, by a plurality of tubes which connect a respective inlet to a plurality of filter element inlets. In a preferred embodiment, the inlet distributor has a distributor chamber with the inlet of the inlet distributor arranged in a wall of that distributor chamber, and the inlets of the filter elements arranged in another wall of the distributor chamber. That is one possible and particularly simple way of distributing the flow of liquid to be filtered substantially uniformly to the inlets of the filter elements that reduces the structural size of the filter apparatus, while also substantially simplifying the assembly and operation of the filter apparatus. Particularly, the outlet of the housing is preferably arranged coaxially relative to the inlet of the inlet distributor. Thus, the inlet and outlet of the filter apparatus are arranged coaxially relative to each other, so that the filter apparatus can be easily installed 'in-line', for example, in an existing pipe line.

In a further preferred configuration, the filter apparatus has a cleaning device with the filter cleaning element for cleaning the filter element arranged at an end of the filter element that is opposite to the inlet. The structural size is further reduced in that way. In addition, that arrangement is highly advantageous because the filter cleaning element can be particularly easily axially introduced into the filter element. Preferably, a separate cleaning device is associated with each filter element. Alternatively, a common cleaning device can be provided, for example, for two adjacently arranged filter elements.

In a further preferred embodiment, the cleaning device has a stroke or lift device, and a stroke bar. The filter cleaning element is arranged on the stroke bar, and the stroke device is adapted to axially introduce the filter cleaning element into the filter element by means of the stroke bar in such a way that a cleaning gap is formed between an inner wall of the filter element and the filter cleaning element. Such a stroke device can be, for example, hydraulic, pneumatic, electric, electromagnetic, or of another configuration. Alternatively or additionally, the stroke device can have a cable arrangement or the like for introducing the stroke bar axially into the filter element.

The filter cleaning element is preferably in the form of a disk having an outside diameter somewhat smaller than the inside diameter of a substantially cylindrical filter element, so that a cleaning gap is formed between filter cleaning element and filter element when the filter cleaning element is introduced into the filter element. When liquid to be filtered flows through the filter element in the axial direction, that liquid has to flow between the inner surface of the filter element and the filter cleaning element. The flow speed is thereby greatly increased locally, and the pressure is locally greatly reduced. In that way, particles adhering to the inner surface of the filter element and filtered out of the liquid are detached and the filter element is cleaned. This effect is also referred to as the Bernoulli effect. This kind of cleaning is particularly advantageous, as the filter element is particularly carefully cleaned by virtue of the contact-less cleaning.

In a further preferred embodiment, the cleaning device has a brush element arranged on the stroke bar. Preferably, the brush element is arranged on the stroke bar adjacent to the filter cleaning element. Further preferably, the brush element is arranged on the stroke bar at a side of the filter cleaning element that is remote from the inlet of the filter element. The flow, which is produced in the filter element for cleaning the filter element by means of the filter cleaning element, is positively influenced by means of such a brush element so that cleaning of the filter element is substantially more effective. In that case the brush acts in a contacting relationship. Surprisingly, it has been found that small living organisms which were filtered out of the liquid to be filtered can be particularly effectively killed off by means of such a brush element. This is highly advantageous if those living organisms are pests such as larvae or the like. The liquid to be filtered, or the liquid which contains the living organisms and/or particles which have been cleaned off, no longer has to be separately disposed of or chemically treated to kill off the living organisms or pests. Rather, the living organisms or pests are killed off directly upon cleaning of the filter element by means of the filter cleaning element and/or the brush element.

In a further preferred configuration, the filter apparatus has a closable back-flushing outlet at an end of the filter element, which is opposite to the inlet, for the selective outlet of liquid used for cleaning the filter element. If the filter element was cleaned by means of the filter cleaning element, the liquid present in the filter element is particularly severely charged with particles (particles which have been cleaned off), so that it is advantageous for that severely contaminated liquid to be removed from the filter apparatus through a back-flushing outlet. Thus, the filter elements are not immediately soiled again, and can further be effectively used for filtering. Preferably, each filter element has such a closable back-flushing outlet. Preferably, all back-flushing outlets of all filter elements are connected together so that they have a common outlet. It is thus particularly easy for the back-flushed liquid to be removed from the filter apparatus.

It is further preferred, if the geometry of the openings of the filter element is so dimensioned, that particles larger than 200 µm, preferably larger than 150 µm, and in particular of a size in the range of between 10 and 20 µm, can be filtered out of the liquid to be filtered. For that purpose, the openings in the filter elements can be, for example, circular, gap-shaped, or the like. Accordingly, the filter element preferably involves a filter fineness of less than 200 µm, preferably less than 150 µm, and in particular a filter fineness in a range of between 10 and 20 µm.

In a further preferred embodiment, one or more of the filter elements can be selectively shut off, in particular by means of a valve. Preferably, all filter elements can be selectively shut off. In that way, individual or all filter elements can be rendered passive. That is, the filter elements can be shut off in such a way that the shut-off filter element or elements are not used for filtering liquid. Preferably, the one or more filter elements can be shut off in such a way that a radial axial flow into the filter element of the liquid to be filtered is prevented. Preferably, at least one valve is provided for that purpose on the filter apparatus. Preferably, the valve is adapted to selectively close and open the respective inlet of a corresponding filter element. Preferably, a corresponding valve is provided for each filter element to be shut off. Preferably, the valve has a valve body for closing an inlet of a corresponding filter element. Insofar as one or more of the filter elements can be selectively shut off, the filter apparatus can be variably adapted to changing liquid volume flows. Depending on the respective requirements, the filter apparatus can thus be operated with a suitable number of filter elements.

In a further aspect of the invention, a method of the kind set forth in the opening part of this specification of filtering liquids attains an object of the invention by admitting liquid to be filtered through at least one inlet into a plurality of filter elements, wherein the filter elements are connected in parallel. The method further includes flowing the liquid through operative surfaces of the filter elements and thereby filtering the liquid, collecting the filtered liquid in a collecting chamber, and letting out the filtered liquid through an outlet, wherein the steps are performed at least partly continuously. In accordance with that method, a flow of liquid to be filtered is divided between a plurality of, that is to say at least two, filter elements, which are connected in parallel in relation to the flow of the liquid. In that way, the structural size of an apparatus by means of which the method according to the invention is performed is substantially reduced. In particular, the structure becomes substantially more compact. In addition, the availability or operational readiness of the apparatus, by means of which the method according to the invention is performed, is substantially increased by connecting the filter elements in parallel, because at least one respective filter element is always available when the filter apparatus is being cleaned. Particularly, the apparatus, by means of which the method according to the invention is performed, is preferably in the form of a Bernoulli filter. Preferably, the method has an additional step of cleaning, and in particular, cleaning by means of a filter cleaning element by axial introduction of the filter cleaning element into a filter element. Particularly, introduction of the filter cleaning element into the filter element is preferably effected by means of a stroke device and a stroke bar.

A first preferred embodiment of the method includes division of the liquid flow to the inlets of the plurality of filter elements. Such division can be effected uniformly, for example, so that substantially the same proportion of the flow of liquid flows into each filter element. Such division can be effected, for example, by means of tubes. Alternatively, such division can also be irregular, so that the proportion of the part of the liquid flow that flows into the filter element is dependent on a degree of fouling of the filter element.

In a further preferred embodiment of the invention, the liquid to be filtered contains living organisms, and the method additionally includes collecting the living organisms at an operative surface of a filter element, and producing a flow at least partly parallel to the operative surface. In this method, the flow is such that at least a part of the collected living organisms is killed off. Such living organisms can be, in particular, pests and the like present in the liquid. Such pests can be, for example, larvae. By the living organisms being killed off by the flow produced, the collected living organisms do not have to be disposed of in a particular fashion or killed off by means of chemical agents. That saves time and cost, and is an environmentally friendly way of killing off pests.

In a further preferred embodiment of the invention, the flow produced is influenced by means of a brush element. Such a brush element is particularly suitable for influencing the flow in such a way that the brush element is suitable for killing off the living organisms. That means that the organisms are killed off in an even more effective manner.

In a further preferred embodiment the method further includes the step of selectively shutting off one or more filter elements, in particular by means of a valve.

In a further preferred embodiment of the method, a filter element having the features of an above-described filter element is used for filtering the liquid, in particular in conjunction with a filter apparatus in accordance with one of the foregoing embodiments. In regard to the advantages, attention is directed to the foregoing description of a filter element of a filter apparatus according to the invention, and to a filter apparatus according to the invention.

BRIEF DESCRIPTION OF THE DRAWINGS

The invention is described hereinafter by means of three embodiments by way of example and with reference to the accompanying Figures in which.

DETAILED DESCRIPTION

Figure 1:
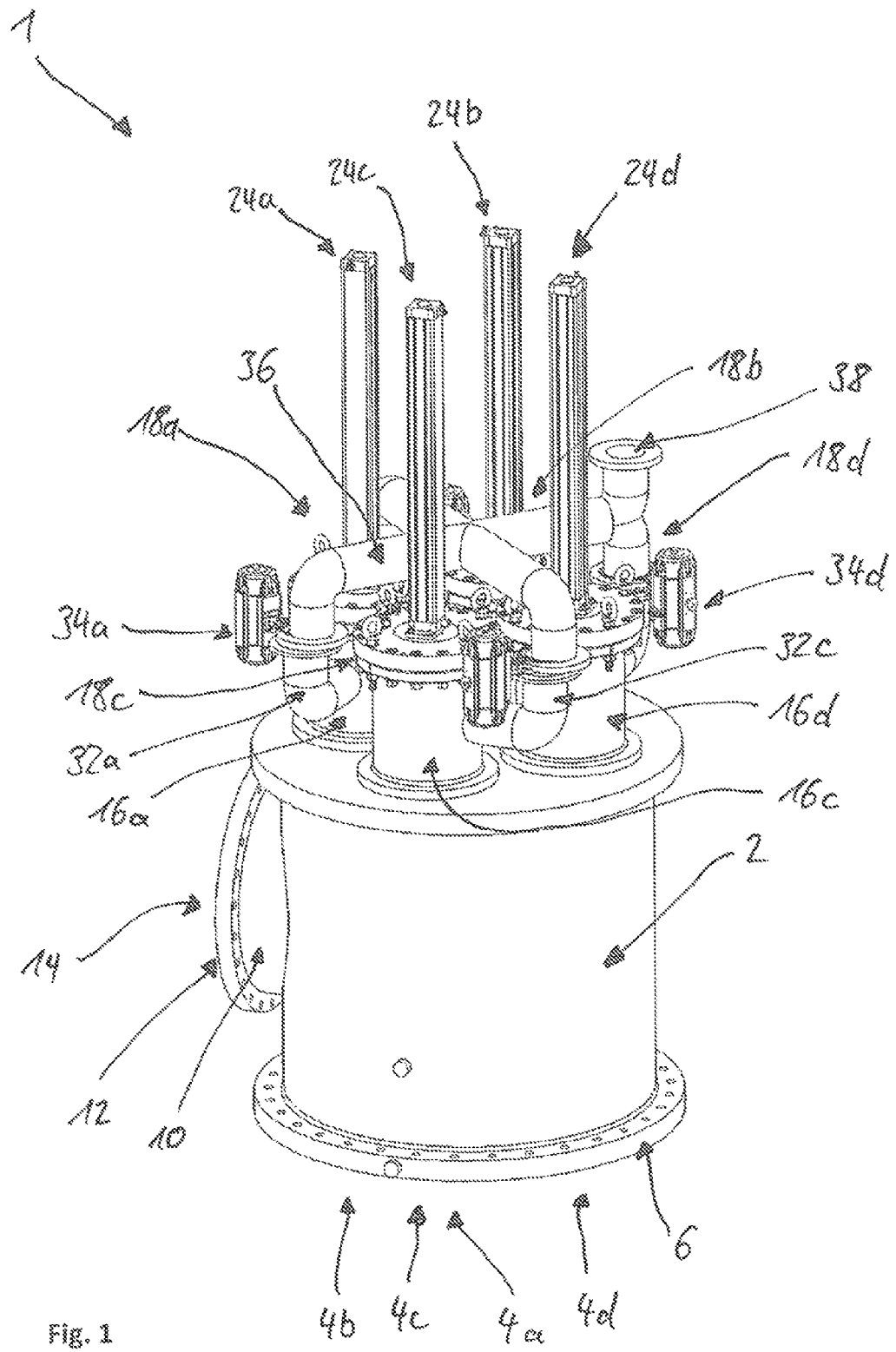
FIG. 1 is a perspective view of a filter apparatus according to a first embodiment.
Figure 2:
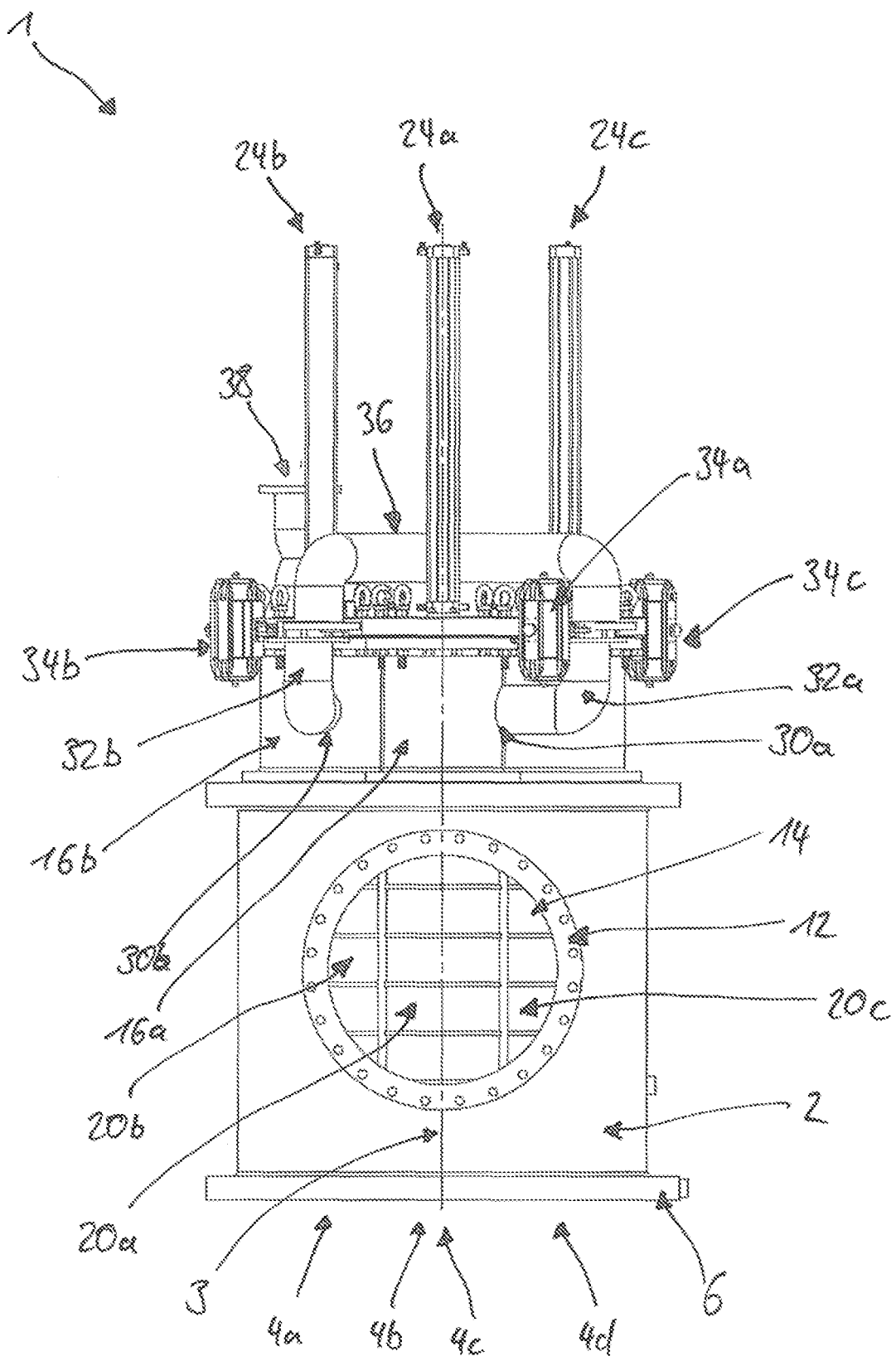
FIG. 2 is a front view of the filter apparatus of FIG. 1.
Figure 3:
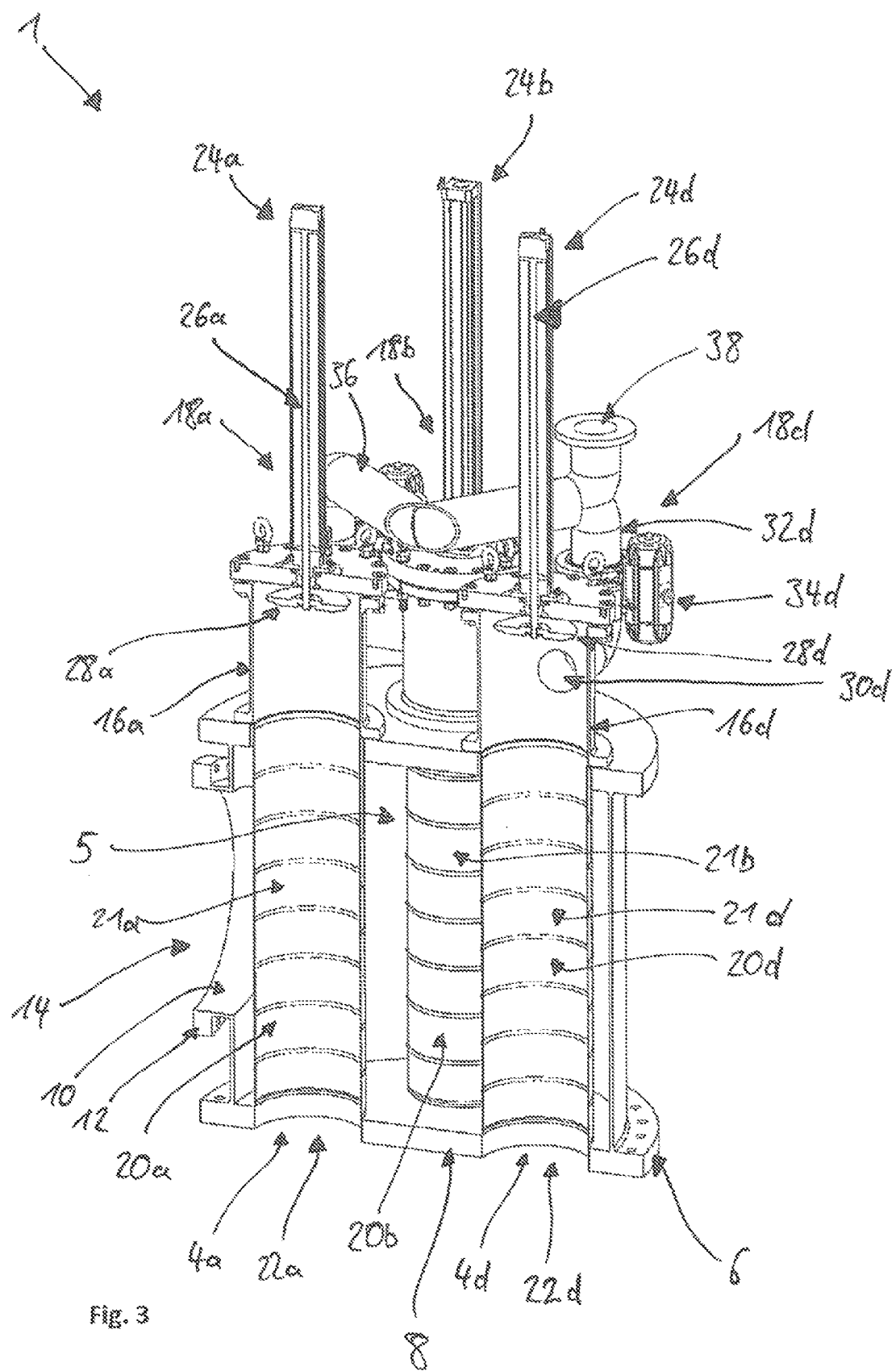
FIG. 3 is a perspective sectional view of the filter apparatus of FIGS. 1 and 2.

The filter apparatus shown in FIGS. 1 through 3 serves for filtering a liquid which, for example, is sea water, cooling water, feed water, process water, or a liquid-solid mixture for chemical, process-engineering or petrochemical procedures. The liquid may also contain living organisms.

A substantially cylindrical housing 2 has four inlets 4a, 4b, 4c, 4d, arranged in a bottom plate 8 of the housing 2, for the admission of the liquid. The bottom plate 8 is surrounded by a flange 6, to which a tube or inlet distributor or the like can be flange-mounted. The housing 2 further has a lateral outlet 14. Arranged at the outlet 14 is a tube 10 with a flange 12, through which the liquid can flow out radially with respect to a longitudinal axis 3 (FIG. 2) of the filter apparatus 1.

Four filter elements 20a, 20b, 20c, 20d (FIGS. 2 and 3) are arranged in the housing 2. Those filter elements 20a, 20b, 20c, 20d are of a cylindrical configuration formed substantially from a metal sheet, and have a plurality of openings (not shown). At a lower end with respect to FIGS. 1 through 3, the filter elements 20a, 20b, 20c, 20d each have an axially arranged inlet 22a, 22b, 22c, 22d which is respectively connected to an inlet 4a, 4b, 4c, 4d of the housing 2. At an upper end with respect to FIGS. 1 through 3, the filter elements 20a, 20b, 20c, 20d are each connected to a closed pipe extension 16a, 16b, 16c, 16d, on which a respective cleaning device 18a, 18b, 18c, 18d is arranged.

A liquid to be filtered flows through the four inlets 4a, 4b, 4c, 4d into the housing 2, and thus through the inlets 22a, 22b, 22c, 22d into the interior of the filter elements 20a, 20b, 20c, 20d. The liquid then flows through the operative surfaces 21a, 21b, 21c, 21d of the filter elements 20a, 20b, 20c, 20d into an intermediate space 5 between an inner wall of the housing 2 and the filter elements 20a, 20b, 20c, 20d. The filtered liquid then flows out of the filter apparatus 1 through the outlet 14. The filter elements 20a, 20b, 20c, 20d are connected in a parallel arrangement with respect to that flow of liquid.

The cleaning devices 18a, 18b, 18c, 18d each have a respective lift or stroke device 24a, 24b, 24c, 24d, and a lift or stroke bar 26a, 26b, 26c, 26d. A filter cleaning element 28a, 28b, 28c, 28d is arranged at the lower end of the stroke bar 26a, 26b, 26c, 26d. The filter cleaning element 28a, 28b, 28c, 28d is of a substantially disk-shaped configuration in this embodiment. The cleaning device 18a, 18b, 18c, 18d is shown in a rest condition in this embodiment. That is to say, the stroke bar 26a, 26b, 26c, 26d is in a retracted position, and the filter cleaning element 28a, 28b, 28c, 28d is outside the filter elements 20a, 20b, 20c, 20d.

In operation of the filter apparatus 1, particles, living organisms, and the like, which are filtered out of the liquid, are deposited at an inner surface of the operative surfaces 21a, 21b, 21c, 21d of the filter elements 20a, 20b, 20c, 20d. As a result, the openings progressively become clogged, whereby it is no longer possible for the liquid to flow through the operative surfaces 21a, 21b, 21c, 21d. To clean the filter elements 20a, 20b, 20c, 20d, the filter cleaning element 28a, 28b, 28c, 28d is introduced axially by means of the stroke bar 26a, 26b, 26c, 26d into the filter elements 20a, 20b, 20c, 20d by way of the stroke device 24a, 24b, 24c, 24d, and is preferably reciprocated in the filter element 20a, 20b, 20c, 20d. As there is only a small gap between an inner wall of the filter element 20a, 20b, 20c, 20d and the filter cleaning element 28a, 28b, 28c, 28d, the flow speed of the liquid flowing in the filter element 20a, 20b, 20c, 20d is locally increased, with the pressure locally decreasing. Adhering particles, living organisms and the like are thereby removed and cleaned off. In that case, living organisms are additionally killed off.

In addition, back-flushing outlets 30a, 30b, 30c, 30d are arranged at the tube extensions 16a, 16b, 16c, 16d, by which severely contaminated liquid can be removed or discharged from the filter apparatus 1 after cleaning of the filter elements 20a, 20b, 20c, 20d by means of the cleaning device 18a, 18b, 18c, 18d. For that purpose, closing devices 34a, 34b, 34c, 34d for selectively opening and closing the back-flushing outlets 30a, 30b, 30c, 30d are arranged at each of those back-flushing outlets 30a, 30b, 30c, 30d. The back-flushing outlets 30a, 30b, 30c, 30d are further connected by means of tubes 32a, 32b, 32c, 32d to a connecting tube 36, which opens in an outlet 38. Thus all back-flushing outlets 30a, 30b, 30c, 30d are connected to the outlet 38, and heavily contaminated liquid can be discharged from the outlet 38 after the cleaning operation.

Insofar as four filter elements 20a, 20b, 20c, 20d are arranged connected in parallel in the housing 2, the structural size of the filter apparatus 1 is substantially reduced, and also the efficiency of the filter apparatus 1 is increased. By virtue of that arrangement, it is possible for the sum of the operative surfaces 21a, 21b, 21c, 21d, which in this embodiment corresponds to the cylindrical peripheral surface of the filter elements 20a, 20b, 20c, 20d, to be greater than the cylindrical peripheral surface of the inner surface of the housing 2. In addition, the volume of the filter element 20a, 20b, 20c, 20d is relatively small in relation to the volume of the overall filter apparatus 1, so that the filter apparatus 1, upon the discharge of severely contaminated liquid after a cleaning operation from the outlet 38, loses comparatively little liquid. That is to say, in relation to the total filter apparatus volume, a small amount of liquid is unfiltered. It is also possible that the cleaning devices 18a, 18b, 18c, 18d are actuated in succession or not at the same time so that in each case, three of the four filter elements 20a, 20b, 20c, 20d are in operation, and only one is not in operation. Operation of the filter apparatus is thereby only slightly restricted.

FIGS. 4 through 7 show a filter apparatus 1 in accordance with a second embodiment in which identical and similar parts are denoted by the same references as used in FIGS. 1-3.

Figure 4:
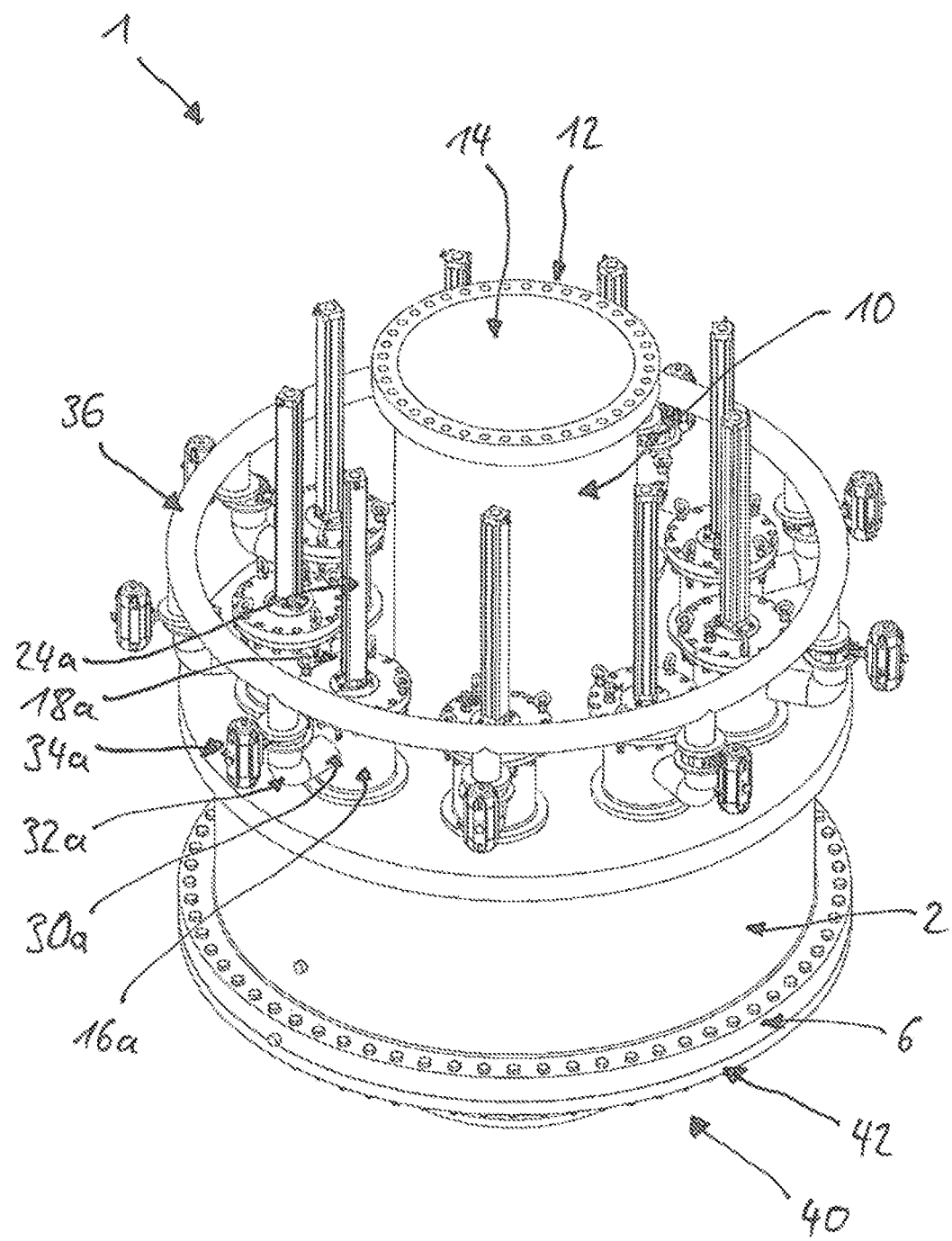
FIG. 4 is a perspective view of a filter apparatus according to a second embodiment.
Figure 5:
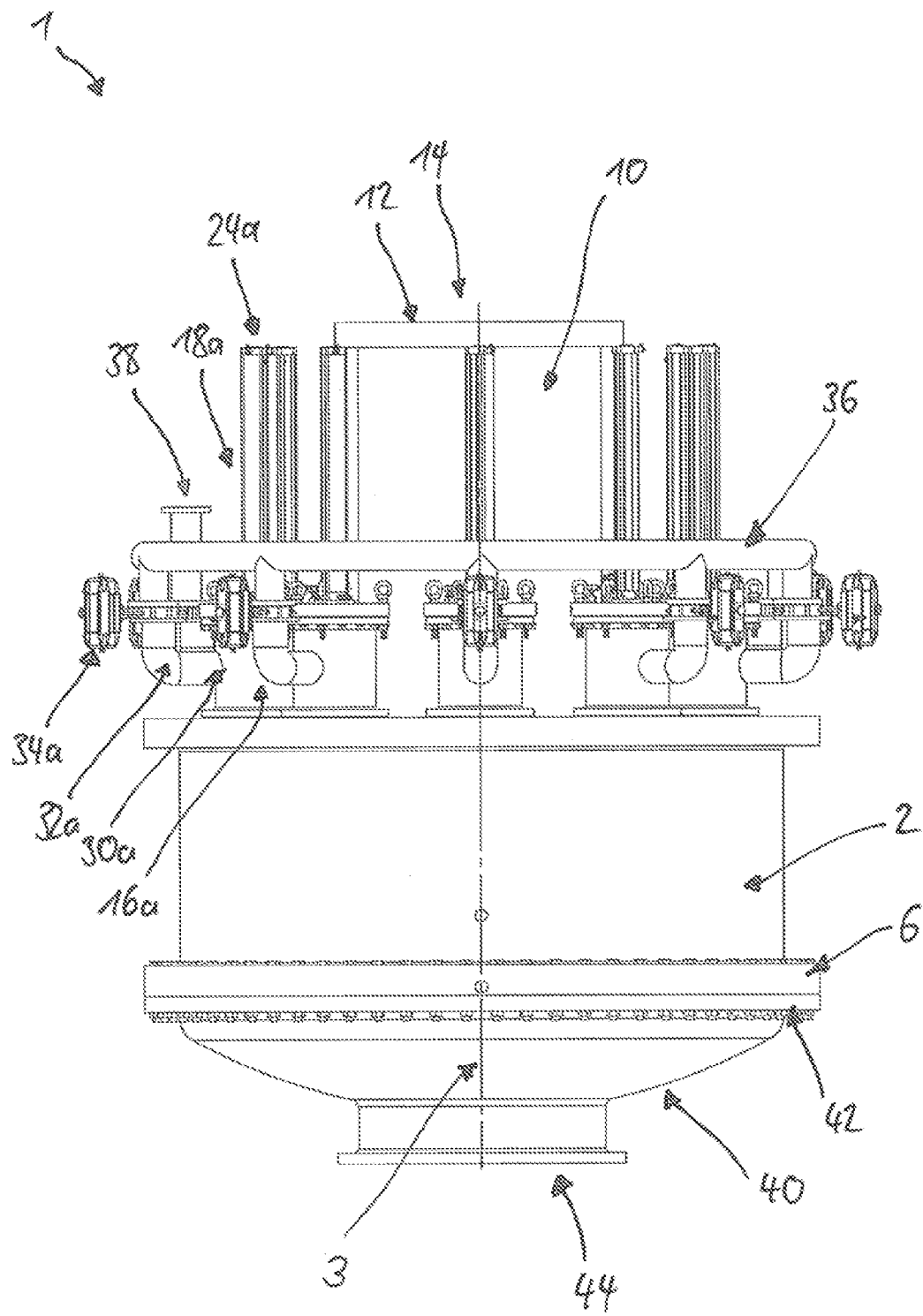
FIG. 5 is a side view of the filter apparatus of FIG. 4.
Figure 6:
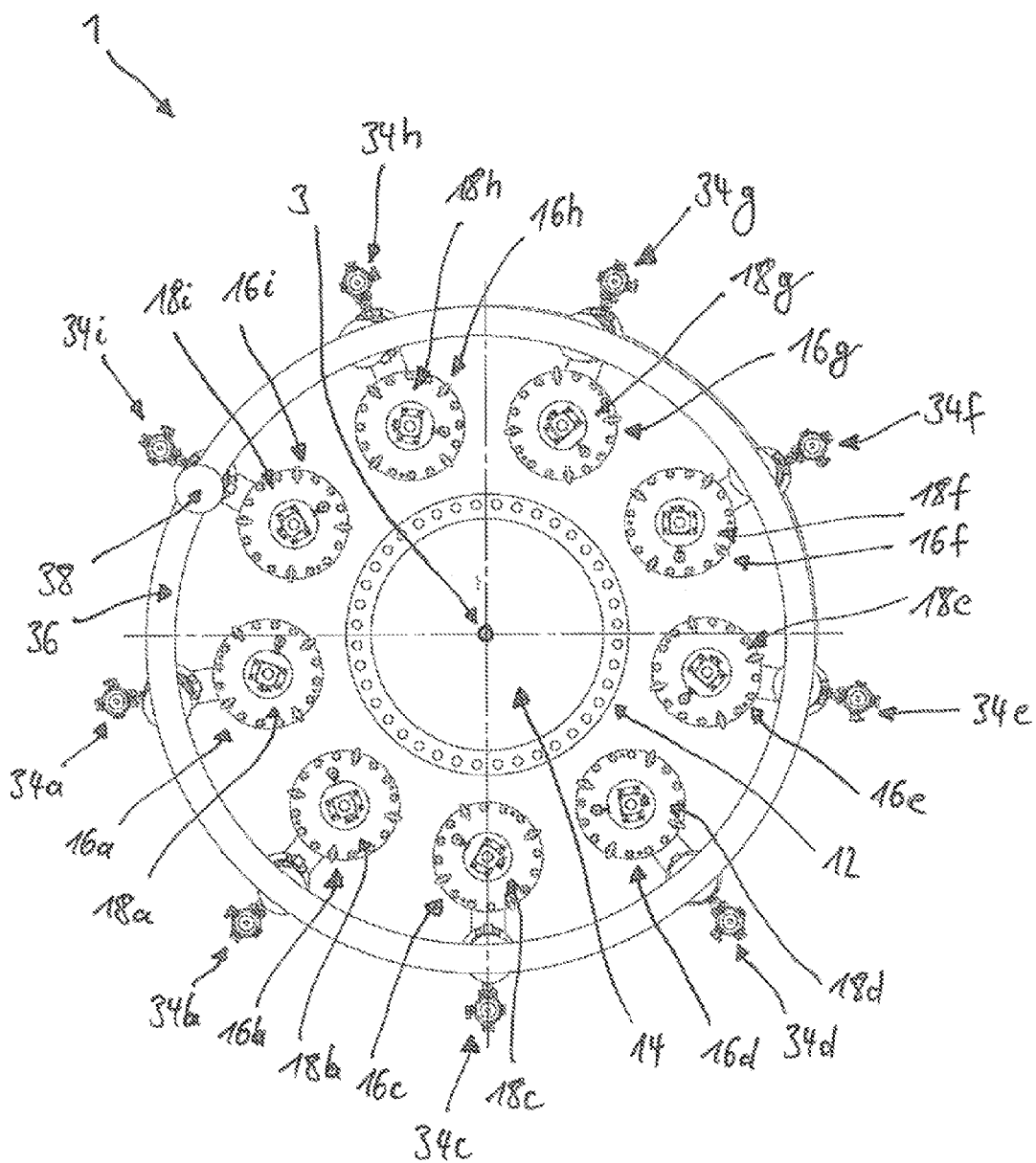
FIG. 6 is a plan view of a filter apparatus of FIGS. 4 and 5.
Figure 7:
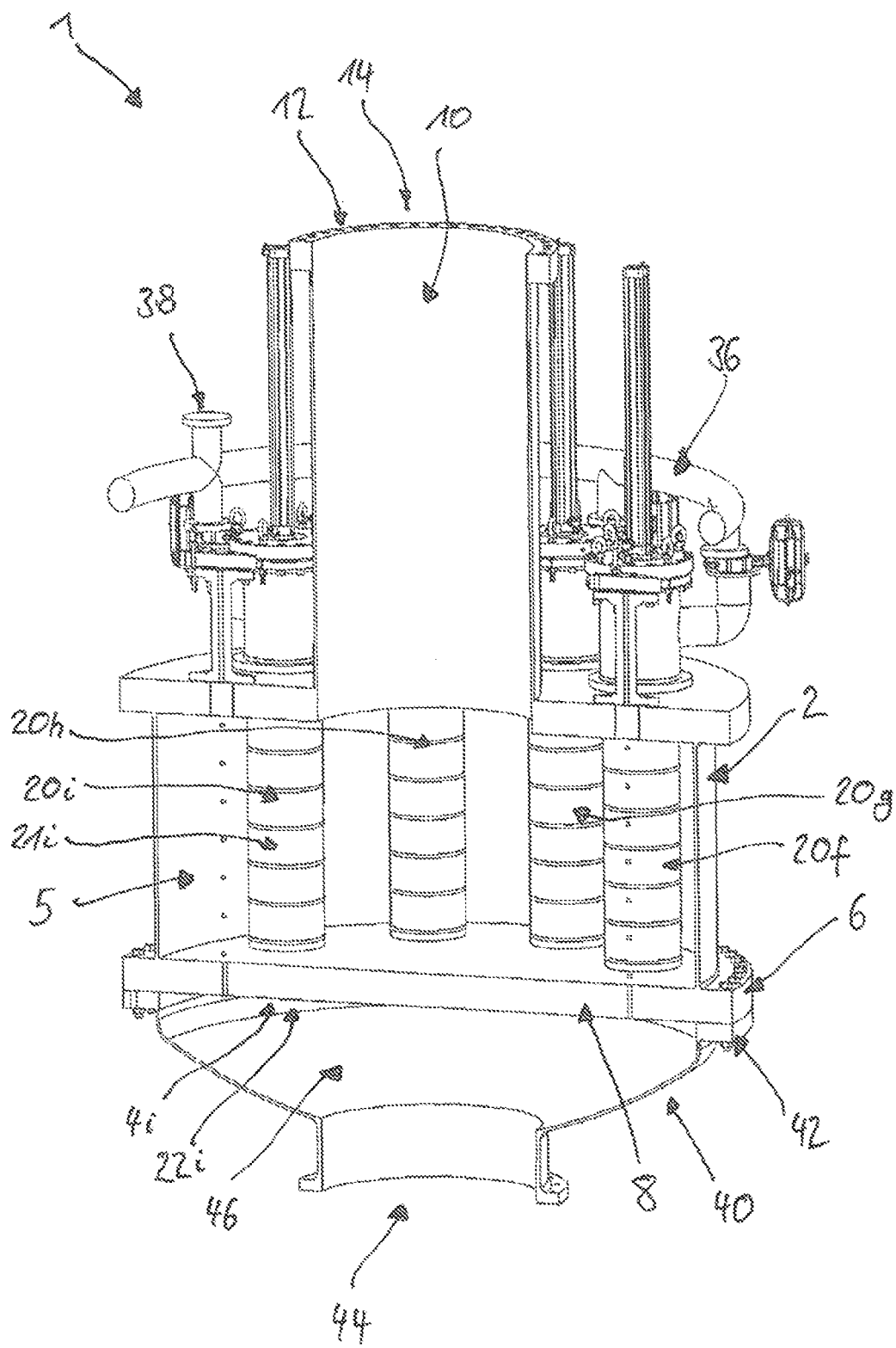
FIG. 7 is a perspective sectional view of the filter apparatus of FIGS. 4 through 6.

The filter apparatus 1 of this second embodiment has a substantially cylindrical housing 2 (FIGS. 4, 5 and 7). Arranged in the housing 2 are nine filter elements 20f, 20g, 20h, 20i (FIG. 7, in which only four of the nine filter elements are provided with reference numerals). Each filter element 20f, 20g, 20h, 20i is associated with a cleaning device 18a-18i, which is respectively arranged on a tube extension 16a-16i of the housing 2 (see in particular FIG. 6). As can be seen in particular from FIG. 6, the nine filter elements 20f, 20g, 20h, 20i (only four of which are provided with reference numerals) are arranged in a circle disposed concentrically relative to the central axis 3 of the filter apparatus 1.

The housing 2 further has an outlet 14, which in this embodiment is arranged axially with respect to the longitudinal axis 3 of the filter apparatus 1, and not radially as in the first embodiment. The filter elements 20f, 20g, 20h, 20i are correspondingly arranged in a circle concentrically around the outlet 14. The outlet 14 is connected to a tube 10 having a flange 12. As can be seen in particular from FIG. 5, the tube 10 with the flange 12 can project in a vertical direction (in relation to FIG. 5) beyond the stroke devices 24a (only one of which is provided with a reference numeral) of the filter apparatus 1. The installation of such a filter apparatus 1 in an existing system is thereby substantially simplified. The structure is also highly compact.

At a lower end (with respect to FIG. 7), the housing 2 has a bottom plate 8. Nine inlets 4i (only one of which is provided with a reference numeral in FIG. 7) are arranged in the bottom plate 8, corresponding to the nine filter elements 20f, 20g, 20h, 20i (only four of which are provided with reference numerals). Those inlets 4i are connected directly to the respective inlet 22i (only one of which is provided with a reference numeral) of the filter elements 20f, 20g, 20h, 20i. In addition, flange-mounted to the flange 6 of the housing 2 is an inlet distributor 40 for distribution of a flow of liquid to be filtered to the inlets 4i. The inlet distributor 40 in this embodiment has a bell-shaped configuration. One end the inlet distributor 40 has a flange 42 for flange-mounting to the housing 2, while the opposite end the inlet distributor 40 has an inlet 44. Together with the bottom plate 8 of the housing 2, the inlet distributor 40 forms a distributor chamber 46. In that case, the inlet 48 is arranged coaxially with respect to the central axis 3 of the filter apparatus 1 (FIG. 5). Thus, the inlet 44 of the inlet distributor 40 and the outlet 14 of the filter apparatus 1 are also oriented in a mutually coaxial relationship, which substantially simplifies installation of such a filter apparatus 1 in an existing system.

In this second embodiment, the liquid to be filtered first flows through the inlet 44 into the distributor chamber 46. From there, the liquid to be filtered flows through one of the inlets 4i (only one of which is provided with a reference numeral) into an internal space of a respective filter element 20f, 20g, 20h, 20i (only four of which are provided with reference numerals). In that case, the liquid flow to be filtered is divided substantially uniformly between the various filter elements 20f, 20g, 20h, 20i. After the liquid to be filtered has flowed substantially axially into a filter element 20f, 20g, 20h, 20i, the liquid flows in the radial direction through the operative surfaces 21i (only one of which is provided with a reference numeral) of the filter elements 20f, 20g, 20h, 20i, and thus passes into the intermediate space 5 between the housing 2 and the filter elements 20f, 20g, 20h, 20i. From there, the liquid, which is now filtered, flows out of the filter apparatus 1 from the outlet 14.

As is also the case in the first embodiment, a back-flushing outlet 30a is arranged at each tube extension 16a-16i (FIGS. 4 and 5, in which only one of the back-flushing outlets 30a is provided with a reference numeral). Each back-flushing outlet 30a is connected to a connecting tube 36 by way of a tube 32a (FIGS. 4 and 5, in which only one of the tubes 32a is provided with a reference numeral). The connecting tube 36 connects all tubes 32a together, and to the outlet 38 for outlet of the back-flushed liquid. In this second embodiment, the connecting tube 36 is circular and is also arranged coaxially with the central axis 3 of the filter apparatus 1. In addition, each back-flushing outlet 30a can be selectively closed with a closing device 34a-34i. Thus, it is possible for the individual filter elements 20f, 20g, 20h, 20i to be cleaned successively, or not at the same time, so that, for example, a respective filter element 20f, 20g, 20h, 20i is cleaned while the remaining eight filter elements are still used for filtering purposes. That substantially increases the operational capability of a filter apparatus 1. In addition, it is possible for liquid which has also already been back-flushed in a cleaning operation, and which was discharged from a back-flushing outlet 30a into the tube 36, to be used for back-flushing a further filter element 20f, 20g, 20h, 20i by means of the connecting tube 36.

Figure 8:
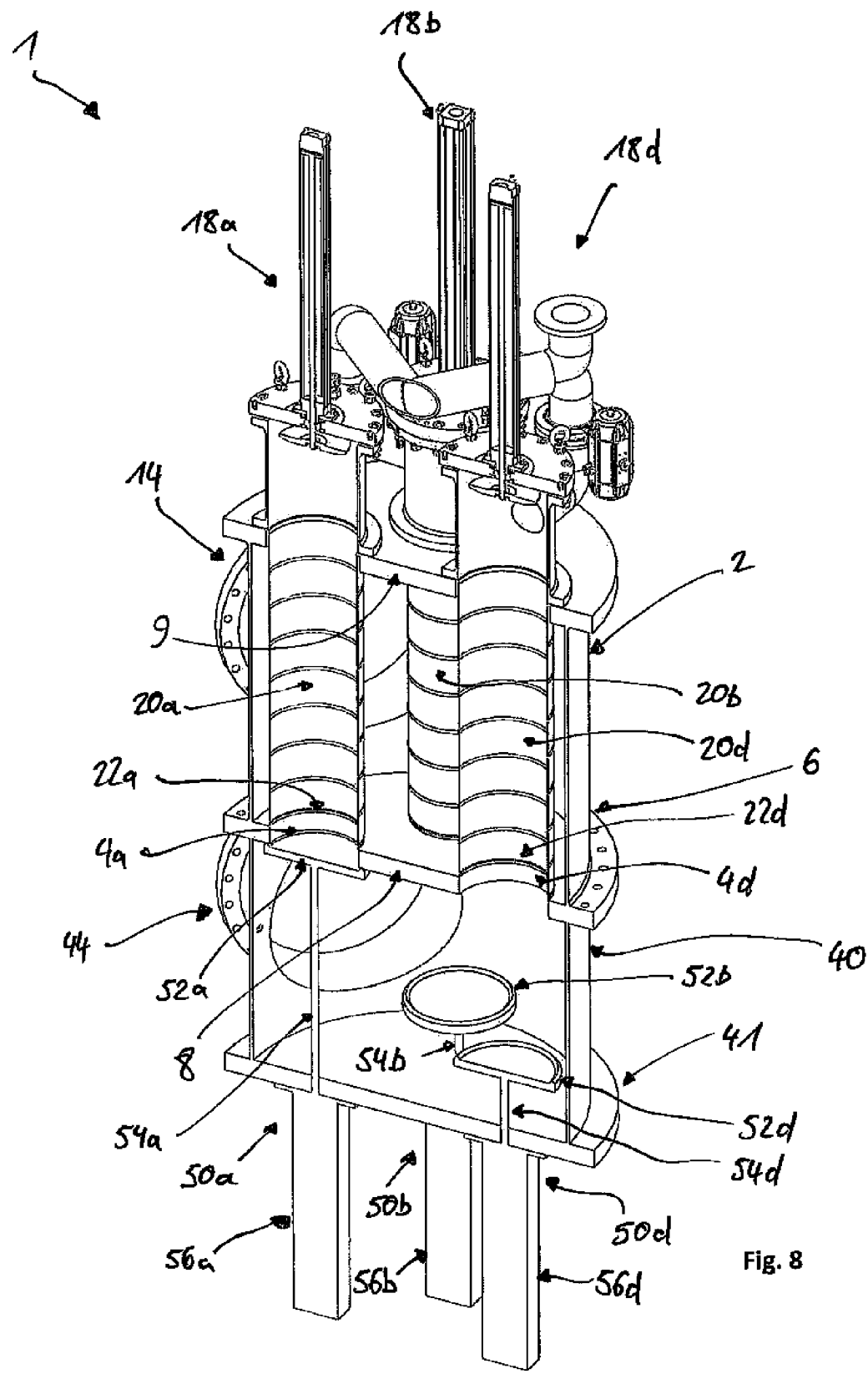
FIG. 8 is a perspective sectional view of a filter apparatus according to a third embodiment.

FIG. 8 shows a further embodiment of the filter apparatus 1 in which the filter elements 20a, 20b, 20c, 20d can be selectively shut off, and identical or similar elements are denoted by the same references. In that respect, reference is made in its full entirety to the foregoing description relating to FIGS. 1 through 7.

In general, the filter apparatus 1 according to the third embodiment is of a configuration corresponding to that of the first embodiment. The apparatus 1 also has a housing 2 having an outlet 14, four filter elements 20a, 20b, 20d (only three of which are shown in FIG. 8) connected in a parallel arrangement in the housing 2, and each provided with a respective cleaning device 18a, 18b, 18d. At the end of the housing 2 that is the lower end in relation to FIG. 8, the housing 2 has a bottom plate 8 in which there are four inlets 4a, 4d (only two of which are provided with reference numerals). The inlets 4a, 4d are connected to the inlets 22a, 22d (only two of which are provided with reference numerals) of the filter elements 20a, 20b, 20d. At an opposite end of the housing 2 that is the upper end, the housing 2 has a top plate 9. Unlike the first embodiment, in FIG. 8, an inlet distributor 40 is formed on the bottom plate 8. The inlet distributor serves not only as a distributor for the liquid to be filtered, but also serves as a receiving means for four valves 50a, 50b, 50d (only three of which are shown in FIG. 8), which are respectively associated with the filter elements 20a, 20b, 20d. For that purpose, the inlet distributor 40 is of a cylindrical shape corresponding to the housing 2, and is closed on the side remote from the housing with a plate 41. In contrast to the second embodiment, the inlet 44 to the inlet distributor 40 in FIG. 8 is oriented transversely relative to a longitudinal axis of the filter apparatus 1. Thus, there is sufficient space for the valves 50a, 50b, 50d.

The valves 50a, 50b, 50d have a valve body 52a, 52b, 52d, which is of a substantially disk-shaped configuration. Edges of the corresponding housing inlets 4a, 4d form a valve seat for the valve bodies 52a, 52b, 52d. The valve bodies 52a, 52b, 52d are respectively mounted on a thrust rod 54a, 54b, 54d, which is oriented substantially coaxially with the corresponding filter elements 20a, 20b, 20d. The thrust rods 54a, 54b, 54d are respectively accommodated in a drive piston 56a, 56b, 56d, by means of which the valves 50a, 50b, 50d are drivable. In an open non-blocked position, the valve bodies 52a, 52b, 52d are disposed in the proximity of the plate 41, as is shown in relation to the valve bodies 52b and 52d in FIG. 8. The valve body 52a is in a closed position as shown in FIG. 8, and thus closes off the filter element 20a. Filter element 20a is thus passive in FIG. 8. That is to say, liquid can admittedly flow through the operative surfaces of the filter element 20a, but no liquid to be filtered is let into the filter element 20a through the inlet 22a.

The invention claimed is:

1. A filter assembly for filtering a liquid, comprising:
a filter housing including a top plate, a bottom plate, a cylindrical wall extending from the top plate to the bottom plate, and an outlet passage;
an inlet distributor including a lowermost plate, a cylindrical wall extending downwardly between the bottom plate and the lowermost plate and defining an interior volume, and an inlet passage;
a plurality of cylindrical filter elements extending vertically from the bottom plate and through the filter housing toward the top plate, each of the cylindrical filter elements including an inlet orifice and an interior that is in fluid communication with the interior volume of the inlet distributor via the inlet orifice;
a plurality of movable cleaning devices, each movable cleaning device being positioned relative to a respective one of the cylindrical filter elements and including a stroke device, a stroke bar, and a filter cleaning element arranged on the stroke bar; and
a plurality of valves, each valve including a valve body sized and shaped to sealingly engage the inlet orifice of a respective one of the cylindrical filter elements, a thrust rod reciprocatingly extending through the lowermost plate, and a drive piston coupled with the valve body by the thrust rod,
wherein each valve body is movable by the respective drive piston such that the valve body sealingly seats with an edge of the respective inlet orifice.

2. The filter assembly of claim 1, wherein the filter housing has a central axis, and the plurality of cylindrical filter elements are arranged in the filter housing so that the central axis of the filter housing and the central axes of the plurality of cylindrical filter elements are substantially parallel.

3. The filter assembly of claim 1, wherein the sum of the operative surface areas of the plurality of cylindrical filter elements is greater than the inner radial surface area of the filter housing.

4. The filter assembly of claim 1, wherein each cylindrical filter element of the plurality of cylindrical filter elements includes a first axial end having the respective inlet orifice, and the liquid flows substantially radially from inside the cylindrical filter element outwardly through the cylindrical filter element.

5. The filter assembly of claim 4, wherein the inlet distributer distributes a flow of the liquid substantially uniformly to the inlet orifices of the cylindrical filter elements.

6. The filter assembly of claim 4, wherein the filter cleaning element of each movable cleaning device is arranged proximate a second axial end of the respective cylindrical filter element that is opposite the first axial end of the cylindrical filter element.

7. The filter assembly of claim 6, wherein the filter cleaning element is arranged on the stroke bar, the stroke device axially introduces the filter cleaning element into the respective cylindrical filter element with the stroke bar so that a cleaning gap is defined between an inner wall of the cylindrical filter element and the filter cleaning element.

8. The filter assembly of claim 7, wherein the filter cleaning element is substantially disk-shaped and has an outside diameter smaller than an inside diameter of the respective cylindrical filter element.

9. The filter assembly of claim 4, further comprising:
a plurality of closable back-flushing outlets for selective outlet of liquid used for cleaning the plurality of cylindrical filter elements, each of the closable back-flushing outlets being operatively coupled to a second axial end of a respective one of the cylindrical filter elements, the second axial end being opposite to the first axial end of the respective cylindrical filter element.

10. The filter assembly of claim 1, wherein each of the cylindrical filter elements includes openings dimensioned so that particles larger than 200 micrometers are filtered out of the liquid when the liquid passes through the cylindrical filter element.

11. The filter assembly of claim 1, wherein the openings are dimensioned so that particles larger than 150 micrometers are filtered out of the liquid when the liquid passes through the cylindrical filter element.

12. The filter assembly of claim 1, wherein the openings are dimensioned so that particles in the range of between 10 and 20 micrometers are filtered out of the liquid when the liquid passes through the cylindrical filter element.

13. The filter assembly of claim 1, wherein the valves selectively shut off a flow of liquid into a respective one of the plurality of cylindrical filter elements.

* * * * *